(12) United States Patent
Gilje

(10) Patent No.: US 8,147,791 B2
(45) Date of Patent: Apr. 3, 2012

(54) REDUCTION OF GRAPHENE OXIDE TO GRAPHENE IN HIGH BOILING POINT SOLVENTS

(75) Inventor: S. Scott Gilje, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 305 days.

(21) Appl. No.: 12/383,215

(22) Filed: Mar. 20, 2009

(65) Prior Publication Data

US 2010/0237296 A1    Sep. 23, 2010

(51) Int. Cl.
*C01B 31/00* (2006.01)
(52) U.S. Cl. .............. 423/448; 423/445 B; 423/445 R; 423/415.1; 252/500; 252/502; 252/510; 977/700; 977/734; 977/755; 977/842; 977/895; 977/900
(58) Field of Classification Search .......... 252/500–511; 423/445 R–447.3, 415.1, 445 B, 448; 977/700, 977/734, 755, 842, 895, 900
See application file for complete search history.

(56) References Cited

U.S. PATENT DOCUMENTS

| | | | | |
|---|---|---|---|---|
| 4,496,533 | A * | 1/1985 | Clausius | 423/448 |
| 7,071,258 | B1 | 7/2006 | Jang et al. | |
| 7,427,369 | B2 | 9/2008 | Guerfi et al. | |
| 2007/0092432 | A1 * | 4/2007 | Prud'Homme et al. | 423/448 |
| 2007/0131915 | A1 * | 6/2007 | Stankovich et al. | 252/511 |
| 2007/0284557 | A1 * | 12/2007 | Gruner et al. | 252/500 |
| 2008/0206124 | A1 | 8/2008 | Jang et al. | |
| 2008/0258359 | A1 | 10/2008 | Zhamu et al. | |
| 2009/0235721 | A1 * | 9/2009 | Robinson et al. | 73/31.05 |
| 2010/0035093 | A1 * | 2/2010 | Ruoff et al. | 429/12 |
| 2010/0144904 | A1 * | 6/2010 | Wang et al. | 516/98 |
| 2011/0130494 | A1 * | 6/2011 | Penicaud et al. | 524/104 |

FOREIGN PATENT DOCUMENTS

FR    2919856    *    2/2009

OTHER PUBLICATIONS

Si et al. (Synthesis of Water Soluble Graphene. Nano Letters, 8(6), pp. 1679-1682, online May 23, 2008).*
Gilje et al. (A Chemical Route to Graphene for Device Applications. Nano Letters, 7(11), pp. 3394-3398, online Oct. 18, 2007).*
Haiqun Chen et al; Mechanically Strong, Electrically Conductive, and Biocompatible Graphene Paper; Advanced Materials; 2008; pp. 1-5; Wiley-VCH Verlag GmbH & Co KGaA, Weinheim.
Dan Li et al; Processable Aqueous Dispersions of Graphene Nanosheets; Nature Nanotechnology; Feb. 2008; pp. 101-105; vol. 3; Published online: Jan. 27, 2008; doi:10.1038/nnano.2007.451; Nature Publishing Group.
Dikin, Dmitriy A. et al; Preparation and Characterization of Graphene Oxide Paper; Nature Nanotechnology; Jul. 26, 2007; pp. 457-460; vol. 448; doi:10.1038/nature06016; Nature Publishing Group.

* cited by examiner

*Primary Examiner* — Mark Kopec
*Assistant Examiner* — Tri V Nguyen
(74) *Attorney, Agent, or Firm* — Carmen Patti Law Group, LLC

(57) ABSTRACT

A method of creating graphene comprising the steps of dispersing graphene oxide into water to form a dispersion. Where the method further comprises adding a solvent to the dispersion to form a solution, and controlling a temperature of the solution to form graphene.

14 Claims, 2 Drawing Sheets

REDUCTION OF GRAPHENE OXIDE TO GRAPHENE IN HIGH BOILING POINT SOLVENTS

TECHNICAL FIELD

This invention relates generally to a method of reducing graphene oxide to graphene and, more particularly, to a method of reducing graphene oxide to graphene in high boiling point solvents.

BACKGROUND

Graphene is an emerging material with potential use in electronics and material sciences. Researchers are always trying to find easier and more efficient ways to create graphene. One method of creating graphene involves reducing graphene oxide to graphene. Graphene oxide is a layered material derived from the oxidation of graphite and is dispersible in water as independent sheets. These sheets may be reduced to graphene by deoxygenating the graphene oxide. As the reduction occurs, it is typical for the graphene sheets to agglomerate with each other, thus crashing as a solid precipitate. A goal is to maintain the uniform dispersibility of these sheets. In other words, agglomeration or clumping in the final product should be minimized as much as possible.

One chemical method of deoxygenating graphene oxide uses hydrazine. Exposing a graphene oxide solution to hydrazine typically causes graphene platelets to precipitate out of the solution. Recent literature reports indicate that careful control of pH and hydrazine concentration can alleviate the tendency of the graphene sheets to agglomerate upon reduction. The requirements of carefully adjusted pH and the removal of hydrazine using dialysis, render this method commercially unattractive. Hydrazine is also a hazardous material that is explosive and highly toxic. The use of hydrazine in this process means that special handling is needed. Also, when using hydrazine, platelets of the graphene tend to agglomerate or clump over prolonged periods. A method of producing graphene without dangerous chemicals would be desirable. A dispersion of individual sheets of graphene that does not contain clumps is more desirable and allows for the use of the resultant product in applications, such as transparent conductors, filler materials for composites or polymeric films.

Thermal deoxygenating is another method of deoxygenating sheets of graphene oxide. This method, however, requires exposing the graphene oxide to temperatures in excess of 1000° C. This process is also slow and requires the use of an inert gas atmosphere, such as Argon. The requirement for an inert gas atmosphere and exceedingly high temperatures makes the creation of graphene more cumbersome. The product of thermal decomposition tends to occur as crumpled sheets instead of flat sheets which also limit the commercial usefulness of the sheets.

SUMMARY

One embodiment of a method and composition is a method of creating graphene comprising the steps of dispersing graphene oxide into water to form a dispersion. The method further comprises adding a solvent to the dispersion to form a solution, and controlling a temperature of the solution to form dispersible graphene.

Another embodiment of the method and composition is a composition comprising reduced graphitic carbon and a solvent where the solvent is at least one of n-methylpyrrolidone, ethylene glycol, glycerin and dimethylpyrrolidone.

DESCRIPTION OF THE DRAWINGS

The features of the embodiments of the present method and composition are set forth with particularity in the appended claims. These embodiments may best be understood by reference to the following description taken in conjunction with the accompanying drawings, in the several figures of which like reference numerals identify like elements, and in which:

DETAILED DESCRIPTION

Embodiments of the present method and composition are a description of reducing graphene oxide to graphene in high boiling point solvents.

As one of ordinary skill in the art will readily appreciate, graphene oxide decomposes to graphene when heated to temperatures around 200° C. When graphene oxide decomposes to graphene, however, it is desirable to keep the graphene as a dispersion so that it can be more easily used in commercial products. One way to reduce graphene oxide to graphene is to deoxygenate the graphene oxide.

Graphene oxide typically appears as water dispersible sheets. The graphene oxide may be reduced to graphene by deoxygenating the graphene oxide sheets to obtain sheets of graphene. When reducing the graphene oxide to graphene, graphene platelets tend to clump up or agglomerate. As mentioned, it is desirable to keep the graphene oxide as a dispersion as the graphene oxide is reduced to graphene.

A method that may lead to the production of dispersible sheets of graphene involves dispersing graphene oxide in water to achieve a dispersion of single graphene oxide sheets and then adding a high boiling point solvent to the dispersion to form a solution. The high boiling point solvent may be a solvent with a boiling point of approximately 200° C. or higher. Because the solvent has a high boiling point, the solution may be heated to approximately 200° C. without boiling off the solvent while deoxygenating the graphene oxide and ultimately to arriving at dispersible graphene. A more detailed description of this method follows.

Figure 1:
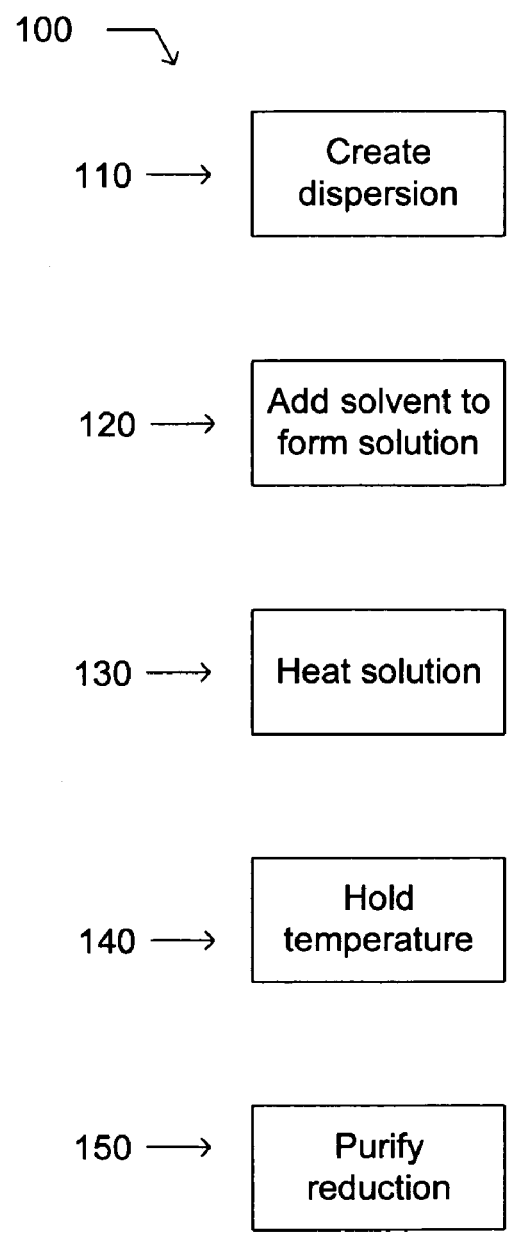
FIG. 1 is a flow chart depicting steps comprising a first embodiment of a method of reducing graphene oxide to graphene.

Turning to FIG. 1, which is a flow chart that depicts a first embodiment 100 of a method of reducing graphene oxide to graphene. In step 110, a dispersion is created. The dispersion may be comprised of graphene oxide dispersed into water by sonication. Sonication as described herein may comprise inducing cavitation through the use of ultrasound for the purpose of achieving a dispersion. The graphene oxide may be in the form of water dispersible sheets. Dispersing the graphene oxide by sonication may result in a dispersion comprised of single platelets of graphene oxide. The single platelets of graphene oxide may form a more stable dispersion. A stable dispersion of graphene oxide may be amenable to forming a dispersion of graphene. A ratio of water to graphene oxide in the dispersion may be approximately one milligram of graphene oxide to approximately one milliliter of water A solvent may be added to the dispersion 120 to form a solution. The solvent may be a water miscible solvent, such as, for example n-methylpyrrolidone, ethylene glycol, glycerin, dimethylpyrrolidone, acetone, tetrahydrofuran, acetonitrile, dimethylformamide, an amine or an alcohol. The amount of solvent added to the dispersion may be approximately equivalent to the amount of the dispersion. Thus if the dispersion is comprised of one milliliter of water and one milligram of graphene oxide, a volume or amount of solvent that is approximately equivalent to one milliliter of water and one milligram of graphene oxide may be added to the dispersion. At this point the solution may be comprised of a mixture with a value that is approximately half graphene oxide/water dispersion and half high boiling point solvent.

The solution may be gradually heated to approximately 200° C. 130. In some embodiments, the solution may be heated in an autoclave or high pressure chamber. As one of ordinary skill in the art will readily appreciate, heating the solution in a pressurized environment may raise the boiling point of the solution, including the solvent. Thus, the boiling point of the solution may reach or exceed 200° C. If the solution is heated in a pressurized environment, a solvent with a boiling point that is slightly below 200° C. may be used.

As the solution is heated the solution may be stirred. Water may be removed via evaporation from the solution as the solution is heated. As water is removed, the temperature of the solution is expected to rise. As the temperature rises the graphene oxide deoxygenates. When the temperature of the solution reaches approximately 200° C. a reduction may be formed. As the solution is heated, the surface of the graphene oxide may be functionalized, which may result in less clumping of the platelets in the final product. In an embodiment, the temperature may be held at approximately 200° C. for a period of time 140 to aid in functionalization of the reduction. In some embodiments the temperature may be held for as little as one hour. In other embodiments the temperature may be held as long as twenty-four hours. In still other embodiments the solution temperature may be held only a moment once the temperature reaches approximately 200° C. to form a reduction.

The reduction may be removed from the heat to allow cooling. Because the reduction may still comprise solvent, the reduction may be purified to remove as much of the remaining solvent as possible 150. Purifying the reduction may comprise filtrating the reduction. The reduction may also be re-disbursed in acetone and may be centrifuged as part of the purification process. The end result of the purification process may be a solid. The solid may be graphene comprising trace amounts of the solvent.

Figure 2:
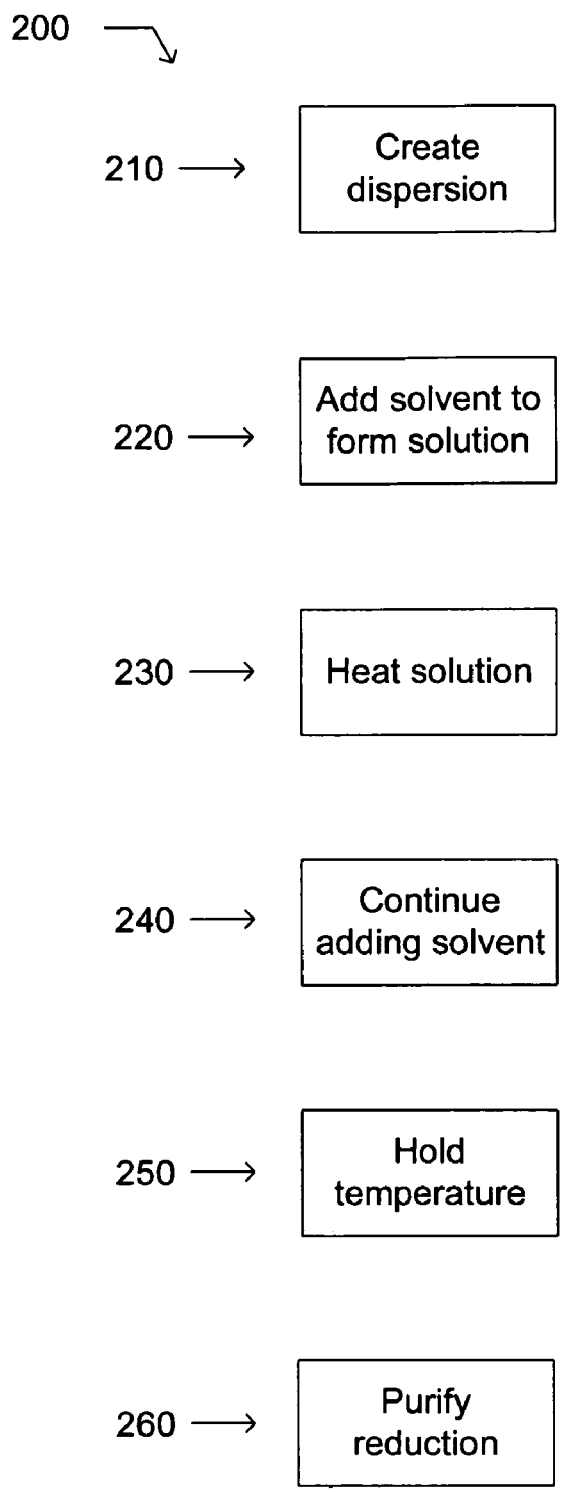
FIG. 2 is a flow chart depicting steps comprising a second embodiment of the method of reducing graphene oxide to graphene.

Turning to FIG. 2, which is a flow-chart that depicts a second embodiment 200 of the method of reducing graphene oxide to graphene. In step 210 of the method a dispersion is created. The dispersion may be comprised of water dispersible sheets of graphene oxide dispersed into water by sonication. The ratio of water to graphene oxide may be approximately two milligrams of graphene oxide to approximately one milligram of water.

A solvent may be added to the dispersion 220 to form a solution. The solvent may be a water miscible solvent, such as, for example n-methlypyrrolidone, ethylene glycol, glycerin, dimethlypyrrolidone, acetone, tetrahydrofuran, acetonitrile, dimethylformamide, an amine or an alcohol. The amount of solvent added to the dispersion may be approximately equivalent to one half the amount of the dispersion. The if the dispersion is comprised of approximately two milligrams of graphene oxide and approximately one milligram of water, the amount of solvent added to the dispersion may be approximately one half the volume or amount of approximately two milligrams of graphene and approximately one milligram of water.

The solution may be gradually heated 230. In some embodiments, the solution may be heated in an autoclave or high pressure chamber. As one of ordinary skill in the art will readily appreciate, heating the solution in a pressurized environment may raise the boiling point of the solution, including the solvent. Thus, the boiling point of the solution may reach or exceed 200° C. If the solution is heated in a pressurized environment, a solvent with a boiling point that is slightly below 200° C. may be used.

As the solution is heated the solution may be stirred. As the solution is heated and stirred water may evaporate from the solution. As water evaporates from the solution, an amount of solvent approximately equivalent to an amount of evaporated water may be added to the dispersion. The steps of gradually heating the solution, stirring the solution and adding solvent to replace evaporated water may continue until the temperature of the solution reaches approximately 200° C. When the temperature reaches approximately 200° C. a reduction may be formed. As the solution is heated, the surface of the graphene oxide may be functionalized, which may result in less clumping of the platelets in the final product. In an embodiment, the temperature may be held at 200° C. for a period of time 240 to aid in functionalization of the reduction. In some embodiments the temperature may be held for as little as one hour. In other embodiments the temperature may be held as long as twenty-four hours. In still other embodiments the temperature may be held only a moment once the temperature of the solution reaches approximately 200° C. to form a reduction.

The reduction may be removed from the heat to allow cooling. The cooled reduction may be purified 260. Purifying the reduction may comprise filtrating the reduction in an effort to remove solvent remaining in the reduction. The reduction may be re-disbursed in acetone and may be centrifuged to recover a solid. The solid may be graphene comprising trace amounts of the solvent.

The present method and composition are not limited to the particular details of the depicted embodiments and other modifications and applications are contemplated. Certain other changes may be made in the above-described embodiments without departing from the true spirit and scope of the present method and composition herein involved. It is intended, therefore, that the subject matter in the above depiction shall be interpreted as illustrative and not in a limiting sense.

I claim:

1. A method of creating graphene consisting of the steps of: dispersing graphene oxide into water to form a dispersion; adding a solvent to the dispersion to form a solution; and controlling a temperature of the solution to form graphene.

2. The method of claim 1 wherein dispersing the graphene oxide into water comprises dispersing the graphene oxide into the water by sonication.

3. The method of claim 1 wherein the dispersion comprises a ratio of approximately one milligram of graphene oxide to approximately one milliliter of water.

4. The method of claim 1 wherein the solvent is a water miscible solvent.

5. The method of claim 4 wherein the water miscible solvent is at least one of n-methylpyrrolidone, ethylene glycol, glycerin, dimethylpyrrolidone, acetone, tetrahydrofuran, acetonitrile, dimethylformamide, an amine and an alcohol.

6. The method of claim 1 wherein adding solvent to the dispersion comprises adding an amount of solvent approximately equivalent to the amount of the dispersion.

7. The method of claim 1 wherein controlling the temperature of the solution comprises heating the solution to approximately 200° C. to form a reduction.

8. The method of claim 7 wherein controlling the temperature of the solution comprises the step of stirring the solution while heating the solution.

9. The method of claim 7 wherein controlling the temperature of the solution comprises the step of holding a temperature of the solution at approximately 200° C.

10. The method of claim 7 wherein controlling the temperature of the solution comprises holding a temperature of the solution once the water has evaporated from the solution.

11. The method of claim 7 wherein controlling the temperature of the solution comprises heating the solution in at least one of an autoclave and a high pressure chamber.

12. The method of claim 1 wherein the graphene oxide is dispersed in water by sonication, and the dispersion comprises a ratio of approximately two milligrams of graphene oxide to approximately one milliliter of water.

13. The method of claim 12 wherein the solvent is a water miscible solvent that is at least one of n-methylpyrrolidone, ethylene glycol, glycerin, dimethylpyrrolidone, acetone, tetrahydrofuran, acetonitrile, dimethylformamide, an amine and an alcohol.

14. The method of claim 12 wherein adding solvent to the dispersion comprises adding an amount of solvent approximately equivalent to one half the amount of dispersion.

\* \* \* \* \*